Jan. 23, 1934.  F. R. DIPPMAN  1,944,155

VALVE

Filed Dec. 11, 1931

Inventor
FRED R. DIPPMAN

By

Attorney

Patented Jan. 23, 1934

1,944,155

UNITED STATES PATENT OFFICE 1,944,155

VALVE

Fred R. Dippman, Mansfield, Ohio, assignor to The Ohio Brass Company, Mansfield, Ohio, a corporation of New Jersey Application December 11, 1931
Serial No. 580,283

4 Claims. (Cl. 251—48)

My invention relates to valves for the control of fluids.

The object of my invention is to provide a valve which is automatically packed to prevent leakage around the stem and to provide a disc for closing the passage through the valve of a new and novel construction.

In valves of the type herein described it is usual to have co-acting parts on the stem and an adjacent portion of the body which contact and are held in contact by means of a spring for preventing leakage around the stem. This construction comprises metal to metal and it is found that the surfaces will in time become more or less dry and the metal will cut or roughen up thus destroying the seal which is the object of the contacting surfaces referred to and leakage will take place.

In some instances packing is placed around the stem which may consist of cotton or asbestos wicking or discs of vulcanized fibre or compositions of various sorts.

In my invention I employ an insert composed of a material not heretofore used to the best of my knowledge for the purpose of sealing the space around the stem to prevent leakage and I also employ this same material in the valve disc for engaging the seat of the valve.

In the drawing accompanying this specification:—

Figure 1:
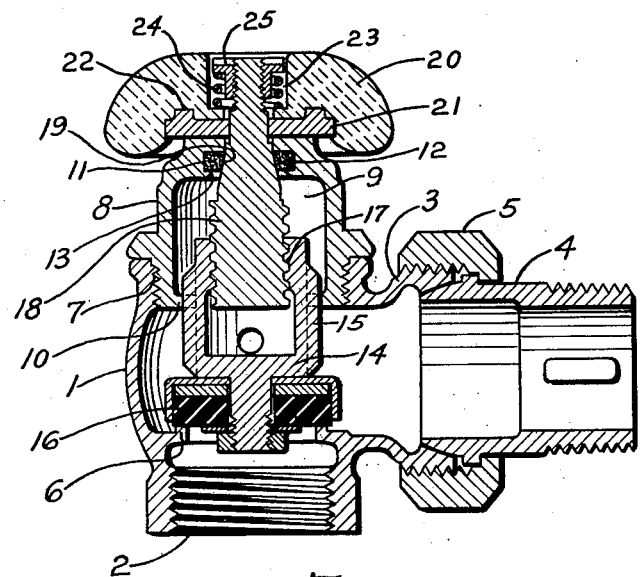
Fig. 1 is a transverse section of my invention through the inlet and outlet ports and the stem.
Figure 2:
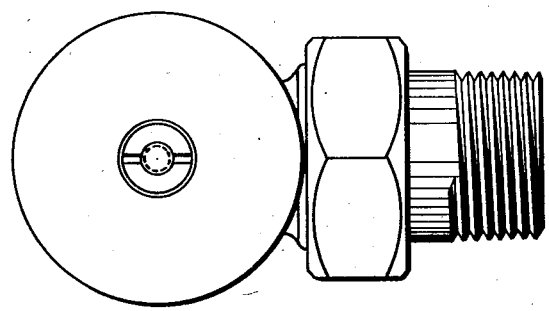
Fig. 2 is a top view in full of Fig. 1 of my invention.
Figure 3:
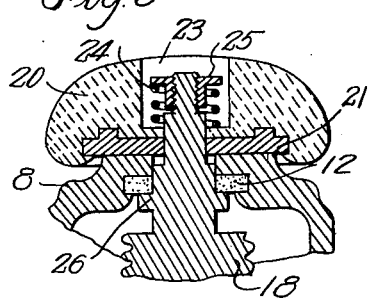
Fig. 3 shows in section a modification of the construction shown in Fig. 1.

Referring to Fig. 1, I provide a body member 1 having a threaded bore 2 and a flange 3 provided with a swivel connector 4 held in place by the nut 5.

The body 1 is also provided with a seat 6 and a threaded upper end 7.

Secured to the threaded upper end 7 of the valve body is a bonnet 8 having a recess 9 and an internally projecting flange 10. The bonnet is provided with a recess 11 in which is positioned a separately formed anti-friction and metallized packing 12 and which is held in position by rolling the edge of the bonnet as at 13.

In order to insure non-leakage between the bonnet 8 and the member 12 I may coat the surfaces of these parts where they contact with a cement such as a thin paste of litharge and glycerine or a celluloid cement or even some of the varnishes of the synthetic resin type. It will be evident that other means of inserting the member 12 in position may be employed than that shown and described.

The member 12 I prefer to make of a mixture of graphite and a metal both being reduced to an impalpable powder and then thoroughly mixed and pressed to shape under pressure and then subjected to heat in a closed container for about 15 to 30 minutes under a temperature of about 1500 degrees F. This tends to unite the particles and binds them together. This material then possesses a characteristic of a metal insert but having in addition the lubricating properties of the graphite. A small amount of binder may be employed with the above materials if desired, such as bitumen.

The metal used may consist of copper or there may be added tin, zinc, lead, etc. in a finely divided state. It is advisable to prevent the access of air to the mixture as much as possible to prevent oxidation while the material is being heated. The heating may be done if desired in a closed chamber filled with an inert gas such as nitrogen.

My valve is also provided with a disc holder 14 which may have wings 15 sliding in slots in the flange 10 thus preventing a rotation of the holder 14. The holder is provided with a valve disc 16 which may be of composition such as rubber or synthetic resin mixed with various ingredients, such as graphite, or it may be of the same material as the insert 12.

The material of which the member 12 is composed and the member 16 might well be termed graphitized metal.

The member 14 is provided at one end with a coarsely threaded passage 17 and operating in this passage is the stem 18 having a thread corresponding therewith. The stem 18 is provided with a tapered surface 19 and the member 12 is provided with a correspondingly tapered surface.

Mounted upon the upper end of the stem 18 is a handle 20 which has a metal plate 21 socketed therein and prevented from rotating by means of lugs 22. The plate 21 rests upon the upper end of the bonnet 8.

The handle 20 is provided with a socket or recess 23 and inserted therein is a spring 24 which bears against the handle and the threaded nut 25 on the upper end of the stem 18.

The action of the spring is to force the handle against the upper end of the bonnet 8 and to move the stem 18 upwardly thus bringing the contacting faces between the members 12 and 18 into contact under constant pressure.

If the holder 14 is of the rotatable type as in many valves in use then the disc 16 will rotate relative to the seat 6 as the valve is closed or opened. I find that the rotation of the stem in contact with the disc 12 produces a polished and what appears to be a complete metallic surface upon the contact surface of the member 12 and the same would be true of the contact surface on the disc 16 if made of the graphitized metal.

It will be recognized that the member 12 will have all the characteristics of a hard metal seat contacting with the seat on the stem 18 but scoring due to cutting under friction will be eliminated because of the graphite in minute particles which is uniformly dispursed throughout the member 12. Thus not only does the stem rotate much more freely than where a non-lubricated joint is employed but wear and cutting as previously stated is eliminated.

Those skilled in the art will recognize that in place of having the tapered contact surfaces between the stem and disc 12 that a flange 26 may be formed on the stem 18 which will contact under spring pressure with the lower exposed face of the member 12.

While I have described the valve as comprising among other parts two members, namely, body 1 and bonnet 8, I have not distinguished between these parts in my claims but considered the parts 1 and 8 as constituting the valve body.

If desired the graphitized-metal member may be impregnated with a pore filling material such as paraffine, phenolic formaldehyde condensation product, etc. which may have some advantages under extreme conditions.

Seating of the handle upon the upper end of the bonnet 8 prevents the breaking of the seal at 19 at the time of opening or closing the valve.

Having described my invention, I claim:—

1. A valve comprising a body and a seat therein, a disc holder and a disc therein to engage the seat, a rotatable non-rising stem having a threaded engagement with the holder to reciprocate the holder relative to the seat when the stem is rotated, a recess in the body through which the stem passes, a graphitized-metal member positioned in said recess and a seat on said member engaging a seat on the stem to prevent leakage around the stem, an inwardly projecting flange on the body to hold the member in place, a handle on the stem to rotate the same and a spring holding the seats on the stem and graphitized-metal member constantly in engagement.

2. A valve comprising a body and a seat therein, a disc holder and a graphitized-metal disc therein to engage the seat, a rotatable non-rising stem having a threaded engagement with the holder to reciprocate the holder relative to the seat when the stem is rotated, a recess in the body through which the stem passes, a graphitized-metal member positioned in said recess and cement interposed between the member and faces of the recess, a seat on said member engaging a seat on the stem to prevent leakage around the stem, a flange on the body to hold the member in the recess, a handle on the stem to rotate the same and a spring holding the seats on the stem and graphitized-metal member constantly in engagement.

3. A valve comprising a body and a seat therein, a disc holder and a graphitized-metal disc therein to engage the seat, a rotatable non-rising stem having a threaded engagement with the holder to reciprocate the holder relative to the seat when the stem is rotated, a recess in the body through which the stem passes, a packing member positioned in said recess and a seat on said member engaging a seat on the stem to prevent leakage around the stem, bent over projecting means on the body to retain the member in place, a handle on the stem to rotate the same and a spring holding the seats on the stem and packing member constantly in engagement.

4. A valve comprising a body and a seat therein, a valve disc to engage the seat, non-reciprocating operating means associated with the disc to reciprocate the same relative to the seat, a handle on the said means to rotate the same, a recess in the body surrounding the operating means, a graphitized metal member positioned in the recess and engaged by the operating means to prevent leakage past the operating means, bent over projecting means on the body to retain the member in place, cementitious material between the graphitized metal member and the walls of the recess to prevent leakage therebetween and means constantly urging the operating means into cooperative engagement with the said member.

FRED R. DIPPMAN.